Figure 1:
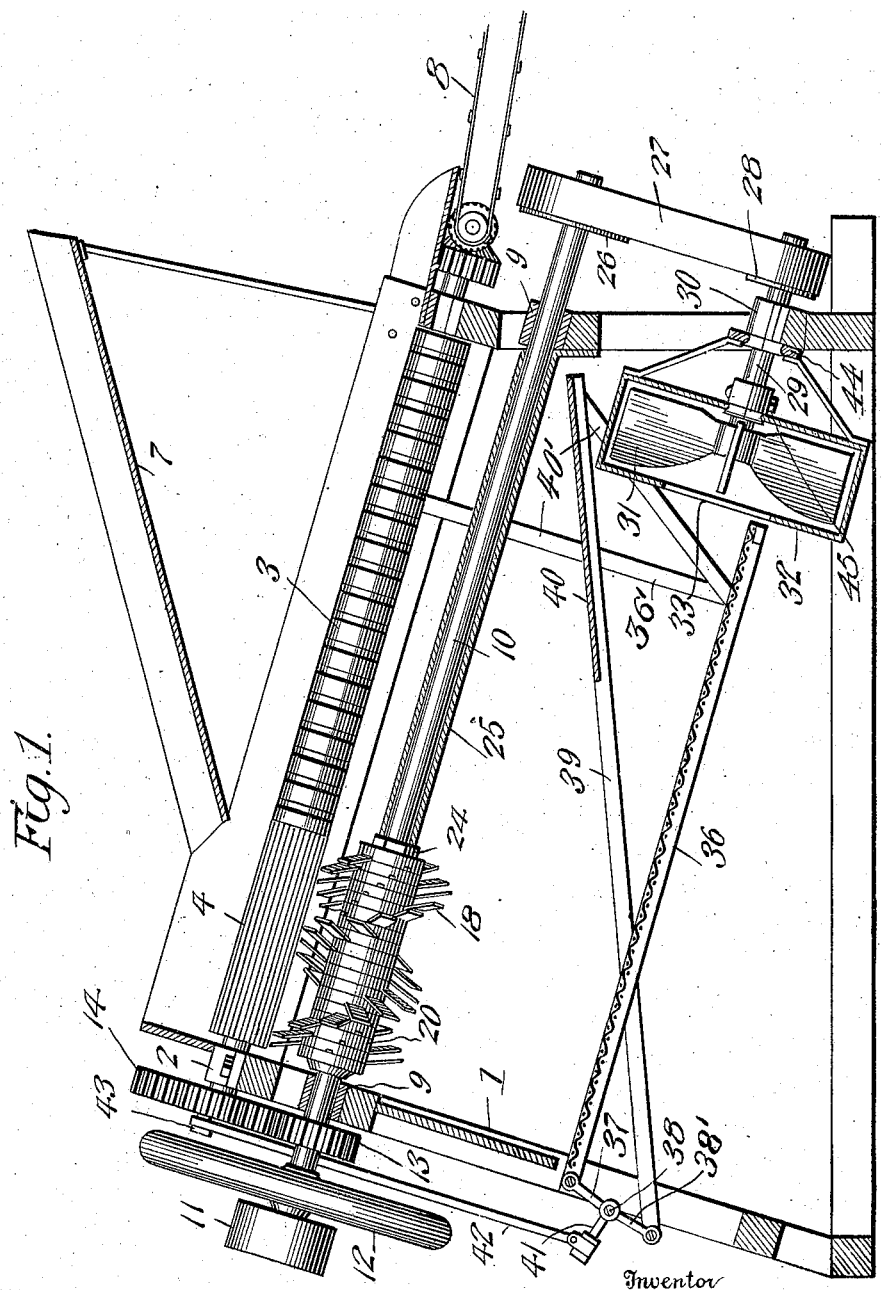

No. 881,761. PATENTED MAR. 10, 1908.
E. G. ADAMS.
CORN HUSKING MACHINE.
APPLICATION FILED SEPT. 5, 1906.

2 SHEETS—SHEET 1.

Witnesses
Geo. Ackman Jr.
J. S. Elmore

Inventor
E. G. Adams,
By Victor J. Evans.
Attorney

No. 881,761.
PATENTED MAR. 10, 1908.
E. G. ADAMS.
CORN HUSKING MACHINE.
APPLICATION FILED SEPT. 5, 1906.
2 SHEETS—SHEET 2.
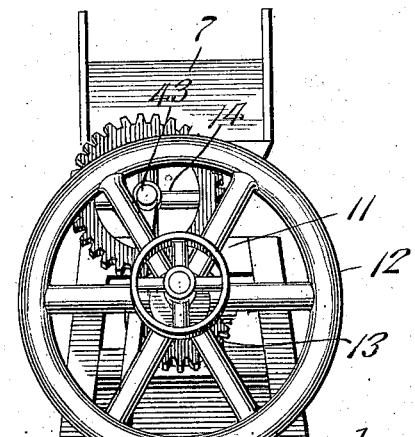
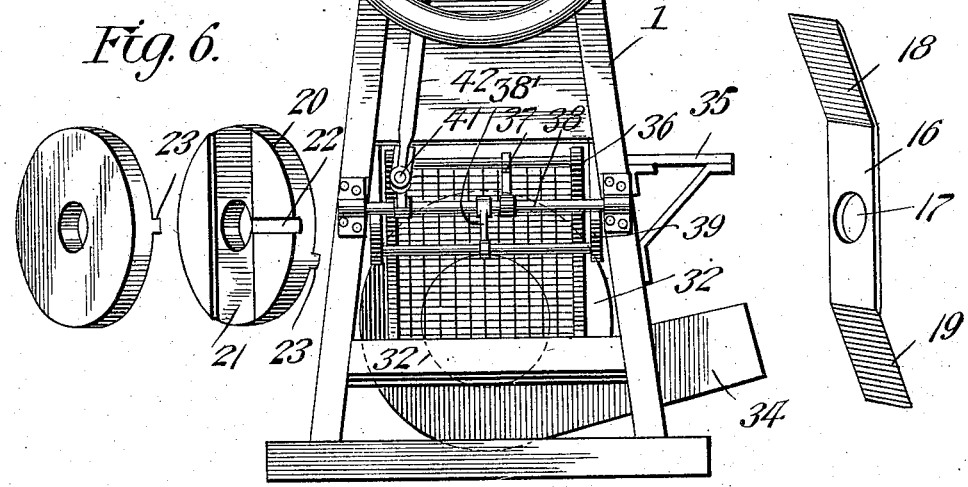
Witnesses
Geo Ackman
F. S. Elmor
Inventor
E. G. Adams,
By Victor J. Evans
Attorney

UNITED STATES PATENT OFFICE.

EDWIN G. ADAMS, OF NEAR PLAIN CITY, OHIO.

CORN-HUSKING MACHINE.

No. 881,761. Specification of Letters Patent. Patented March 10, 1908.

Application filed September 5, 1906. Serial No. 333,403.

*To all whom it may concern:*

Be it known that I, EDWIN G. ADAMS, a citizen of the United States, residing near Plain City, in the county of Union and State of Ohio, have invented new and useful Improvements in Corn-Husking Machines, of which the following is a specification.

This invention relates to corn husking machines, and has for its objects to produce a comparatively simple, inexpensive device of this character in which the corn will be effectually husked without injury to the grains or ears, and one wherein the stalks after passing through the snapping rollers will be disintegrated and shredded and the resultant decorticated material discharged from the machine.

With these and other objects in view, the invention comprises the novel features of construction and combination of parts more fully hereinafter described.

In the accompanying drawings: Figure 1 is a vertical longitudinal section taken centrally through a machine embodying the invention. Fig. 2 is a front end elevation of the machine. Fig. 3 is a plan view of the snapping and husking rollers. Fig. 4 is a detail, sectional view on an enlarged scale taken on the line 4—4 of Fig. 3. Fig. 5 is a similar view taken on the line 5—5 of Fig. 3. Fig. 6 is a perspective view of a pair of the coöperating clamping disks employed on the decorticating shaft. Fig. 7 is a perspective view of one of the decorticating blades.

Referring to the drawings, 1 designates the main frame having bearings 2 in which are journaled a pair of coöperating downwardly and rearwardly inclined snapping and husking rollers 3 provided at their forward ends and throughout a suitable portion of their length with longitudinal ribs or corrugations 4 adapting the forward portions of the rollers, the ends of which may be held yieldable in place, for snapping the corn from the stalks, while provided on each of the rollers in rear of the snapping portion thereof is a longitudinal set or row of husk engaging spurs or teeth 5 having large flat surfaced heads arranged to register with corresponding peripheral grooves or channels 6 formed in and partly around the companion roller, it being noted in this connection that the grooves 6 are of a depth somewhat greater than the length of the active portions of the spurs 5 and that the teeth on one roller will enter the grooves in the other roller as the rollers revolve.

Sustained on the frame 1 above the rollers 3 is a downwardly and forwardly inclined feed table or chute 7 having its lower discharge end positioned above and for delivering the corn onto the ribbed or snapping portions 4 of the rollers, the material being in turn delivered from the side into the chute by hand, while journaled in bearings 9 9 in the frame beneath the rollers 3 is a downwardly and rearwardly inclined decorticating shaft 10 provided at its forward end with a belt pulley 11 and a balance wheel 12, there being also fixed on the shaft 10 a gear 13 in mesh with a pinion 14 fixed on the journal at the forward end of one of the rollers 3, the journals at the rear ends of which are provided with intermeshing gears 15 adapted the rollers to be driven one from the other and in relatively reverse directions.

Arranged on the shaft 10 at a point beneath and extending throughout the length of the snapping portions 4 of the overlying rollers is a series of decorticating members or blades 16, each having a central shaft receiving opening 17 and reversely disposed angular cutting portions or knives 18 having sharpened forward edges, the blades being fixed on the shaft and maintained in spaced relation through the medium of coöperating disk-like clamping members 20 each provided in its rear face with a transverse seat or recess 21 adapted to receive the intermediate portion of one of the blades and with a groove 22 disposed on a line perpendicular to the recess 21 and adapted to receive a radial spline or rib 23 formed on the front face of the next adjacent disk, whereby the disks, which are maintained in assembled order on the shaft by means of a nut 24 disposed to bear on the rear end disk, are held against relative rotation.

Fixed on the rear end of shaft 10, which at a point beneath and throughout the length of the husking portions of the rollers 3, is inclosed in a tubular shell or casing 25, is a belt pulley 26 connected by a belt 27 with a corresponding pulley 28 fixed on the rear end of a fan shaft 29 journaled in suitable bearings 30 on the frame and carrying a suction fan 31 of suitable form housed in a casing 32 having in its front side wall an inlet opening 33 through which the decorticated stover is received into the casing and through which the air suction created by the fan cleans the few shelled grains and particles of light weight while passing over the screen 36, the casing being further provided with a tangentially arranged discharge port or spout 34 of suitable proportion which may be adjusted to various inclinations by rotating the fan casing on bearings 44 and 45, the spout being extended transversely of and for delivering the material at one side of the machine, which is provided at a point above the discharge spout 34 with a table or platform 35 on which the attendant may stand.

Sustained in the frame 1 at a point beneath the shaft 10 and in front of the casing 32 is a vibratory table or screen 36 having its rear end terminated adjacent to and in line with the opening 33 and its forward end connected with one arm of a rocking lever 37 journaled between its ends as at 38 and having its other arm 38' pivoted to the adjacent ends of the pair of downwardly and forwardly inclined bars or rails 39 which support a correspondingly inclined, vibratory table or platform 40 arranged above the fan casing 32 and beneath the rearward ends of the rollers 3, there being fixed on the lever 37 a centrally disposed, forwardly projecting crank arm 41 to which is pivoted the lower end of an eccentric rod 42 having its upper end journaled on a wrist pin 43 carried by and arranged eccentrically of the pinion 14. The screen 36 is movably supported at its inner end by a link 36' hingedly attached to the frame of the machine and to the screen. The inner end of the table 40 is flexibly connected with the screen 36 by a link 40'.

In practice, motion is imparted to the shaft 10 from any suitable source of power through the medium of a belt arranged over the pulley 11 and is transmitted from said shaft to the rollers 3 through the medium of the gear and pinion 13, 14, and to the fan shaft 29 by means of the belt 27. The corn to be acted upon is conveyed by hand to the chute 7 from which it is delivered onto the snapping portions 4 of the rollers by which the stalks will be engaged and drawn vertically downward for stripping or snapping the ears therefrom. As the stalks pass downward between the rollers they will be acted upon by the knives 18 and under the action of the latter reduced to a shredded or decorticated condition before falling onto the vibratory table or screen 36, while the ears of corn will, after being freed from the stalks travel toward the rearward ends of the rollers 3 and be husked under the action of the teeth or spurs 5, the husked ears being delivered at the rear end of the machine onto and conveyed therefrom by a suitable carrier 8 operatively connected with and driven from the intermeshing gears 15 and serving to carry the material to a point suitably remote from the machine, while the husks are carried downward between the rollers and delivered onto one or the other of the vibratory tables 36 or 40, from which latter they will pass onto the former.

During operation of the machine the lever 37 will be rocked through the medium of the pitman 42, which is in turn operated by the pinion 14, and will, in action, impart a longitudinal vibratory motion to the tables 36 and 40 for properly feeding the fodder downward thereon. The material passes from the rearward end of table 36 through the opening 33 into the fan casing 32, from which it is discharged under the action of the fan outward through the spout 34 to one side of the machine. It will be observed that owing to the semi-circular grooves 6 being of a depth greater than the length of the active portions of the large faced spurs 5 the latter will engage and tear the husks from the ears without injuring the kernels, whereby the integrity of the ears of corn will be preserved and its market value consequently enhanced.

Having thus described my invention, what I claim is:

1. In a corn husking machine, the combination of a pair of inclined combined snapping and husking rollers arranged with their snapping portions at the highest point, means for driving the rollers simultaneously, a shaft disposed parallel with and below the rollers and provided with decorticating knives arranged below the snapping portions of the latter, a gearing between the shaft and one of the rollers, means for driving the shaft, a fan, a shaft therefor disposed parallel with the first-mentioned shaft, a belt and pulley mechanism between the shafts, an inclined vibrating table arranged directly above the fan, a screen disposed parallel with and below the knife carrying shaft and in line with the fan, means for flexibly supporting the end of the screen adjacent the fan, means for flexibly supporting the table on the screen, and a mechanism for simultaneously vibrating the screen and table.

2. In a corn husking machine, the combination of a pair of combined snapping and husking rollers, a shaft disposed below the same and having decorticating knives under the snapping portions of the rollers, means for driving the shaft, a pinion on the shaft, a gear wheel on one of the rollers meshing with the pinion, means for driving one roller by the other, a screen disposed below the shaft, an inclined table between the screen and husking portions of the rollers, links for suspending the inner end of the screen, links for supporting the inner end of the table directly on the screen, an oscillating lever on which the outer end of the screen is hinged, means for connecting the table with the lever, a crank and pitman connection between the lever and gear wheel, the said lever being arranged to vibrate the table and screen simultaneously in opposite directions, a fan arranged in coöperative relation with the screen, and a driving mechanism between the shaft and fan.

In testimony whereof, I affix my signature in presence of two witnesses.

EDWIN G. ADAMS.

Witnesses:
  J. Q. CONWAY,
  GRACE P. SHERWOOD.